United States Patent [19]

Van Druff

[11] Patent Number: 5,339,773

[45] Date of Patent: Aug. 23, 1994

[54] TRACK WITH MOVEABLE TROLLEY FOR TETHERING AND RESTRAINING AN ANIMAL

[76] Inventor: Benjamin Van Druff, 622 Oak Hill School Rd., Townsend, Del. 19734

[21] Appl. No.: 61,490

[22] Filed: May 13, 1993

[51] Int. Cl.⁵ .............................................. A01K 1/06
[52] U.S. Cl. ................. 119/785; 105/141; 105/154
[58] Field of Search ............. 119/120, 109, 15.1, 119/119, 703, 704, 784, 785; 472/85, 86, 87; 105/141, 154

[56] References Cited

U.S. PATENT DOCUMENTS

| | | | |
|---|---|---|---|
| 1,233,649 | 7/1917 | Hareza et al. ................ | 119/120 |
| 1,525,713 | 2/1925 | Baughman . | |
| 2,522,654 | 9/1950 | Wamsley ...................... | 105/154 |
| 3,203,399 | 8/1965 | Banks ............................ | 119/120 |
| 3,550,535 | 12/1970 | Rooklyn ....................... | 105/141 |
| 4,161,924 | 7/1979 | Welkes ......................... | 119/120 |
| 4,232,630 | 11/1980 | Orlowski et al. ............. | 119/120 |
| 4,619,222 | 10/1986 | Sundberg et al. . | |
| 4,862,833 | 9/1989 | Brotz ............................. | 119/120 |

FOREIGN PATENT DOCUMENTS

| | | | |
|---|---|---|---|
| 35387 | 4/1886 | Fed. Rep. of Germany ...... | 119/120 |
| 2458213 | 2/1981 | France ......................... | 119/120 |

Primary Examiner—Gene Mancene
Assistant Examiner—Todd E. Manahan
Attorney, Agent, or Firm—Connolly and Hutz

[57] ABSTRACT

A semi-permanent apparatus and a method for tethering and restraining grazing animals, house pets and security dogs comprises a moveable trolley mounted on a track attached to a solid surface, such as the ground. One end of a tether is attached to the animal and the other end of the tether is attached to the trolley. The trolley moves along the track when the animal tugs at the tether, but the track, trolley and tether prevent the animal from roaming to a distance from the track beyond the length of the tether.

13 Claims, 2 Drawing Sheets

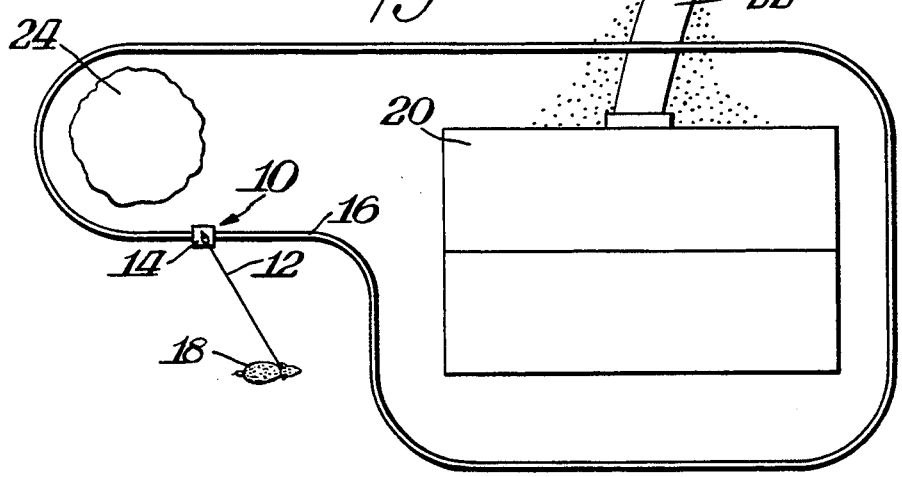
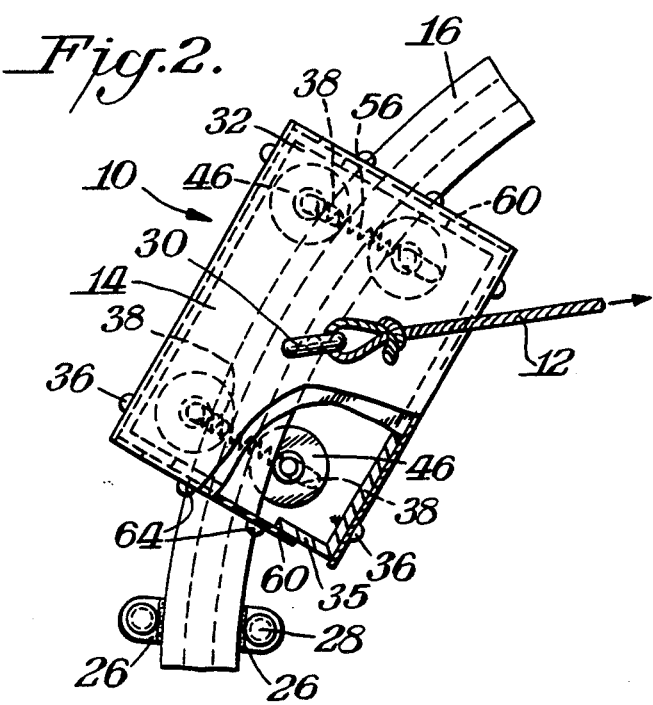
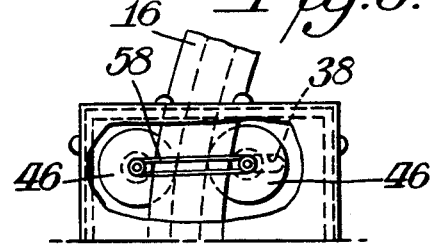
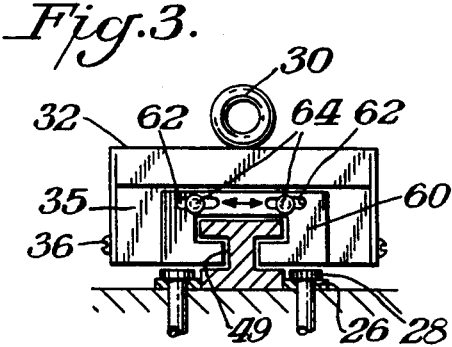
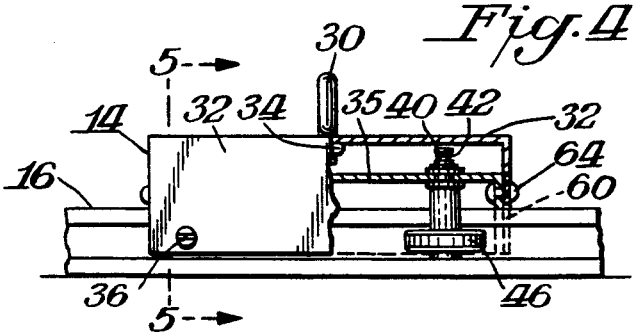

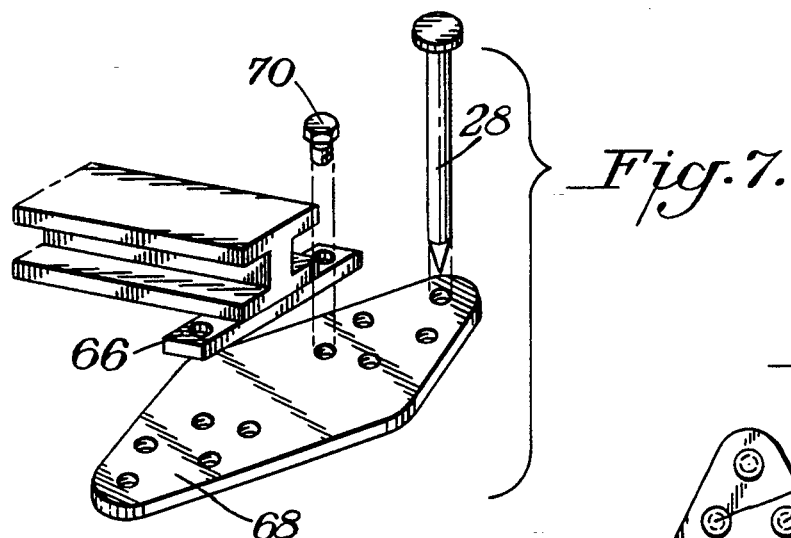
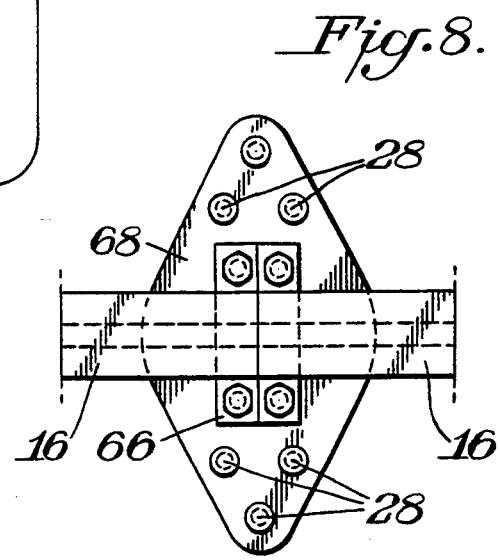
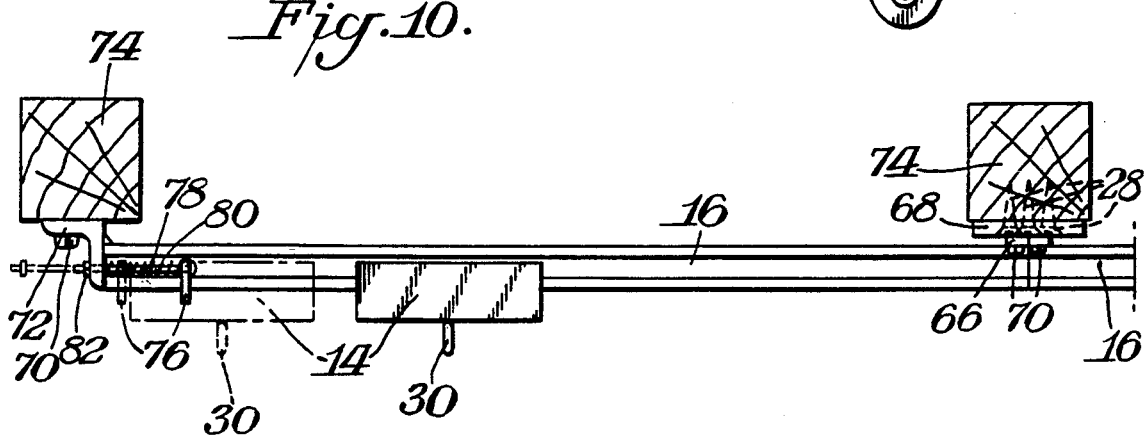
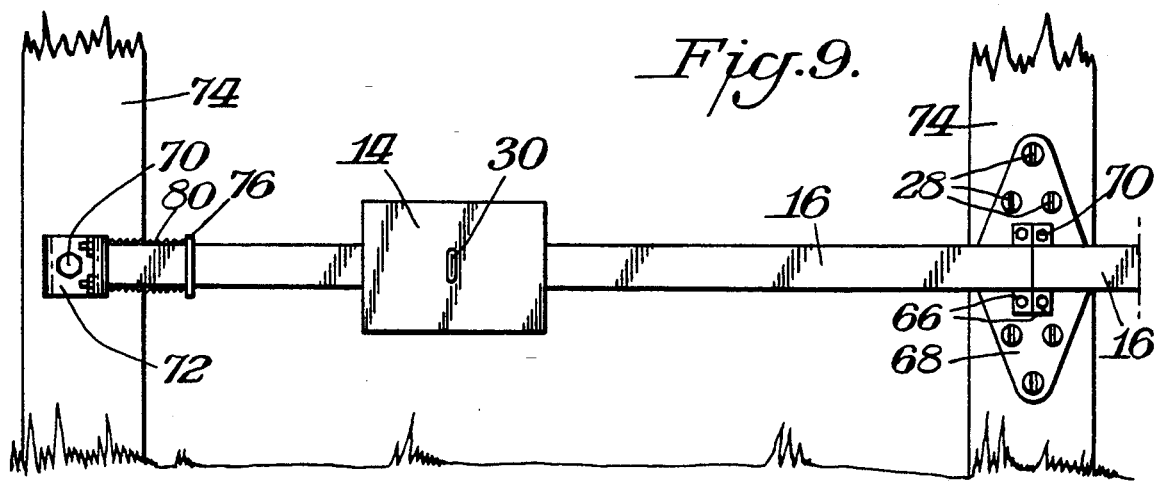

TRACK WITH MOVEABLE TROLLEY FOR TETHERING AND RESTRAINING AN ANIMAL

BACKGROUND OF THE INVENTION

The present invention relates to an apparatus and a method for tethering and restraining an animal, such as a grazing animal or a house pet, including a horse, sheep, goat, dog or cat. A security-trained dog may also be tethered and restrained by this apparatus. It is known in the art to restrain such animals in various ways. For example, grazing animals may be held within a pasture by a fence or may be tied by a rope or chain to a ground-driven stake or other stationary object. House pets, such as dogs, may also be fenced or tied by rope or chain to a stationary object, such as a stake or a tree.

Animals that are tied to stationary objects lose freedom of movement. Their movements are limited by the length of the tether. When the only restraint is a fence, many animals will not remain within the fenced enclosure. Moreover, the cost of fencing in a pasture or an enclosure may be prohibitive and there may be other limitations on the type and height of fence permitted in an area.

Alternative means for restraining animals are electric fences. Such fences may be installed above ground and emit a shock when an animal (or person) approaches. They may also be comprised of a buried electricity-conducting wire that triggers a shock to the animal through a special collar worn by the animal when the animal approaches the wire. Such electric fences may be prohibitively expensive and may pose unreasonable health and safety risks in some circumstances.

While not provided particularly for restraining animals, courses have been proposed for exhibiting, exercising and training animals. U.S. Pat. No. 1,525,713 discloses a device for exhibiting wild animals wherein the wild or exotic animals are chained to a plurality of carriages that travel along an overhead wire or rod "track" disposed around the inner edge of the course. Chasing animals, such as dogs, are similarly chained behind the exotic animals. Inner and outer fences are provided around the exotic animal exhibition course to restrain the animals and protect the spectators. U.S. Pat. No. 4,619,222 discloses a race-horse training course, whereby horses are tied to overhead motor-driven carriages that travel along a pole-mounted guide around the training course. The horses run to keep up with the motor-driven carriage. If any horse does not keep up the pace, however, the tether to the carriage is releasable so as not to injure the horse.

SUMMARY OF THE INVENTION

The present invention is an apparatus and a method for tethering and restraining an animal. The apparatus comprises a track attached to a solid surface, such as the ground, a sidewalk, a wall or a fence, to form a course. The track may form a contiguous course, with curves or bends as well as straight sections, or it may terminate at one or both ends. The track may be an I-beam, preferably formed from a strong metal that will not easily bend or chip when subjected to typical outdoor temperature and weather conditions or when stressed by tensile forces from animals over time. The track may also be of another cross-section configuration, such as that of a train rail. Preferably, the bottom surface of the track is attached or welded to end tabs, which in turn can be attached firmly to mounting plates. The mounting plates are then attached to the solid vertical and/or horizontal surfaces with fasteners, such as screws, bolts or stakes when the track is laid to form the course.

Mounted on the track is a moveable trolley that travels on and along the track in at least one direction. The trolley has within the body of the trolley preferably two pairs of axle-mounted wheels, each wheel pair being biased. The wheels may be formed of a rubber or elastomer material and may be individually mounted to separate axles with needle or ball bearings. When the trolley is properly mounted on the track, the wheels will be in frictional contact with the side webs of the track, and each wheel of a respective pair will be on an opposite side of the track. Slots formed in the top of the trolley body receive the upper portions of the individual wheel axles and permit a limited amount of lateral axle movement so that the trolley may travel about a curved portion of the track without the wheels losing their frictional contact with the track web.

Swivelable means, such as a ring or chain, may be provided for attaching a tether, such as a rope or chain or leash, to the top of the trolley. The trolley preferably has a housing covering the trolley body, as well as the tops of the wheel axles and the wheel-biasing means that are exposed through the slots in the top of the body. When a housing is provided, the means for attaching the tether may be on top of the housing.

After the track is secured to the solid surface and the trolley is mounted on the track, an animal may be tethered and restrained by attaching one end of the tether to the trolley and the other end to the animal's collar, halter, harness or bridle. The animal may tug at the tether and pull the trolley along the track while the tether, trolley and track prevent the animal from roaming to a distance from the track beyond the length of the tether. The animal has a range of movement around the trolley and need not remain on any one side of the trolley. Depending upon the track course and the length of the attached tether, the animal will be able to travel along the course and a substantial distance within and outside the course.

The trolley is partly swivelable from side to side on the track so that when the animal tugs the tether at an angle to the direction of trolley travel on the track, the trolley will slightly tilt. Nevertheless, the trolley is not releasable from the track when subjected to tensile forces on the tether from the animal. The apparatus is suitable for tethering and restraining a variety of grazing animals and house pets, including, but not limited to, dogs, sheep, horses, cats and goats. A K-9 security-trained dog can also be tethered to the trolley and the track can be installed around the perimeter of a property, permitting the security dog to patrol the entire property.

Sections of track may be installed and removed as desired. Preferably, the ends of respective track sections will be configured so that the ends of adjacent track sections will closely abut together when the track is laid in a course. While the track is installed securely to withstand the tensile forces from the tugging animal, the installation is more flexible than an aboveground fence or a buried electric fence. The track configuration can be changed or moved and reinstalled in a new location without substantial difficulty or expense. Moreover, the track can be installed on the ground or attached to existing structures. There is no need to erect a separate support structure for the track.

In a preferred embodiment, the trolley is provided with a stone guard, that may be attached to the housing. Such a stone guard will push most stones and other debris off the upper and side surfaces of the track, preventing such debris from entering the trolley body interior.

BRIEF DESCRIPTION OF THE DRAWINGS

FIG. 1 is a diagrammatic top plan view of an apparatus for tethering and restraining an animal according to the invention and shows one form of track course layout with a trolley mounted to a ground-laid track and an animal tethered to the trolley.

FIG. 2 is a top plan view of the trolley and track shown in FIG. 1, wherein the trolley has a portion of the hood and trolley body broken away and the trolley is travelling along a curved portion of the track.

FIG. 3 is an end elevational view of the trolley mounted on the track.

FIG. 4 is a side elevational view of the trolley having a portion of the hood and trolley body broken away.

FIG. 5 is a cross-sectional end elevational view of the trolley and track taken along the line 5—5 of FIG. 4.

FIG. 6 is a fragmental top plan view of the trolley partially broken away to show an alternate means of biasing the tracking wheels of the trolley against the web of the track.

FIG. 7 is an exploded perspective view of a means for mounting the track.

FIG. 8 is a top plan view of two sections of the track attached to the end tabs and mounting plate, with the ends of the track sections abutted together.

FIG. 9 is a top plan view showing the trolley on the track attached to the vertical side surfaces of two fence posts.

FIG. 10 is a side elevational view of the trolley on the track as shown in FIG. 9.

DESCRIPTION OF THE PREFERRED EMBODIMENT

Referring to FIG. 1, there is shown a diagram of an apparatus for tethering and restraining an animal 10. The apparatus comprises a tether 12 having attached at one end an animal 18 and at the other end a trolley 14. The trolley 14 is mounted on the track 16, which is shown in a residential layout surrounding a building 20 and a tree 24 and crossing a sidewalk 22. The track 16 may be laid out in a contiguous course with curved and straight sections, such as shown in FIG. 1, but other track configurations are possible and a stop or dead-end can be provided. The trolley 14 preferably is moveable back and forth along the track 16, but must be moveable in at least one direction. As shown in FIG. 1, the animal 18, such as a dog, may freely walk or run around the building 20 and around or under the tree 24 on either side of the track 16. The animal 18 may roam beyond the course of the track 16, but only as far as the length of the tether 12.

Referring now to FIGS. 2-6, the detail of the construction of the trolley 14 and track 16 is shown in greater detail. The track 16 preferably is formed from an I-beam. Any standard I-beam of a material that will withstand the forces exerted by the animal 18 without bending and the weather conditions without weakening or chipping would be suitable. The track 16 may also be formed from other shaped rails. Pairs of ring clamps 26 are attached to the outer edges of the lower web of the I-beam at intervals along the length of the track 16. The ring clamps 26 define openings through which stakes or spikes 28 may be driven to hold the track 16 against a solid surface, such as the ground or a gravel path.

Once all the sections of the track course have been installed, the trolley 14 may be mounted onto the track 16. The trolley 14 consists of two pairs of biased axle-mounted wheels 46 inside a trolley body 35 that is preferably further enclosed by a hood 32 and a stone guard 60. A tether ring 30 is attached to the top surface of the trolley 14 by a swivelable nut and bolt 34. One end of the tether 12, such as a chain or rope or leash, is connected to the tether ring 30.

Within the trolley body 35, the wheels 46 are individually mounted on grooved axles 40 and rest just above the base or bottom end 44 of the axles 40. The wheels 46 may be of a rubber or elastomeric material for durability and noise reduction, and needle or ball bearings may be included to reduce frictional resistance. Above each wheel 46, a spacer 47 is provided on each axle 40. Next, a grommet 50 is provided on top of each spacer 47. The grommet 50 must be durable and is preferably made from brass or a strong nylon.

The trolley body 35 has a generally flat rectangularly-shaped upper surface, two parallel side surfaces generally perpendicular to the upper surface, and two end surfaces. When installed on the track 16, the longest length of the trolley body 35 is disposed along the length of the track 16 and the side surfaces partially encase the upper portion of the track 16. Two pairs of opposed slots 38 are formed in the upper trolley body 35 surface, with one pair near each end of the body. The slots are preferably cut straight and perpendicular to the body side walls, although curved slots are also satisfactory. Into each slot 38 the top end 54 of one grooved wheel axle 40 is installed. The grommet 50 holds the axle 40 in place within the slot 38, and the spacer 47 adjusts and maintains the space between the upper surface of the trolley body 35 and the wheel 46. A c-clip 52 is then installed on each axle 40 atop the grommet 50 to hold the grommet 50 in place. Finally, spring-wheel biasing means 56 or band-wheel biasing means 58 are fit within a groove 42 of each of the two axles 40 forming a front pair of axles 40 and a back pair of axles 40.

Each wheel 46 is held in contact with the vertical side surface or web 49 of the track 16 by the action of the wheel biasing means 56 or 58. As shown in FIG. 2, for example, as the trolley rounds a curve in the track 16, the axles 40 within the grommets 50 shift position within the slots 38 in the trolley body 35 to permit the trolley 14 to round the curves freely. The wheel biasing means 56 or 58 ensure that a force is applied to the axles 40 to hold the wheels 46 in contact with the track wall 49, which both maintains stable trolley movement, and ensures that the trolley will remain mounted on the track.

In a preferred embodiment a hood 32, attached to the side walls of the body with fasteners 36, protects the top of the axles 54 and the wheel biasing means 56 or 58 from exposure to the elements, debris or tampering. In this embodiment, the tether ring 30 is attached to the upper outer surface of the hood 32.

In a further preferred embodiment, a stone guard 60, having slots 62, is attached to the end walls of the trolley body by fasteners 64. The stone guard 60 operates similarly to a snow plow or cow-catcher by pushing debris off the top and side-wall surfaces of the track. In this manner debris should not contaminate or block the wheels or the trolley body interior. The slots 62 permit the stone guard 60 to shift slightly from side to side and thereby travel around the curved sections of the track without interference.

An alternate means for mounting the track 16 to a solid surface is shown in FIGS. 7-10. Referring to FIG. 7, a section of track 16 is welded to an end tab 66. The end tab 66 is mounted to a mounting plate 68 with a pair of fasteners, such as bolts or screws, 70 each individually placed first into one of a pair of holes in the end tab and then into the corresponding of a pair of holes in the mounting plate 68. The mounting plate 68 shown in FIGS. 7 and 8 has a diamond-shaped cross-section, although this plate may have various cross-sectional shapes and still be used with the invention. This mounting plate 68 has four holes (two pairs) centrally located to facilitate mounting of the end tabs and track to the mounting plate 68. The ends of two sections of track 16 may be attached to one mounting plate 68 so that the ends abut together as shown in FIG. 8.

The mounting plate 68 additionally has one or more holes spaced away from the center of the plate into which fasteners, such as spikes, stakes or screws 28 may be inserted when the mounting plate 68 is attached to a solid surface. In FIGS. 7-10, the mounting plate 68 is shown with six such additional holes, three outwardly spaced from the two pairs of holes into which the bolts or screws 70 are inserted.

As shown in FIGS. 9 and 10, the track 16 may be mounted to a vertical solid surface, such as a fence post 74. Referring to the right hand portions of FIGS. 9 and 10, the track sections are attached to the mounting plate 68. The mounting plate 68 is mounted to the post 74 with spikes or screws 28 inserted through the holes in the mounting plate 68 and then into the post 74.

Where the track 16 is to terminate at a stop, one means for providing a stop is shown in the left hand portions of FIGS. 9 and 10. A section of track 16 is attached to a stop bracket 72 having an "L" shape. A pair of slidable bolts or pins 78 is inserted first through a pair of holes in the stop plate 76, then through a pair of springs 80, and then through a pair of holes through the other end of the stop bracket 72. The bolts or pins 78 are movably held within the holes in the stop bracket by nuts or c-clips 82 in grooves formed in the ends of each of the bolts or pins 78. The stop plate 76 has a "C"-shaped cross section and is positioned around one web of the track 16, preferably the upper web. The stop plate 76 will slide along the track from the edge of the end of the stop bracket 72 to the length of travel of the springs 80 and pins or bolts 78.

When pressure is applied against the stop plate 76, such as when the trolley 14 is urged against the stop plate 76 toward the stop bracket 72, the stop plate 76 will slide toward the stop bracket 72, compressing the springs 80 and moving the bolts or pins 78 through the holes in the stop bracket 72. Compressing the springs 80 will build up a force directed against movement toward the stop bracket 72 by the stop plate 76 and the trolley 14. Even should the force on the stop plate 76 overcome the spring force, the fully compressed springs 80 and the stop bracket 72 will prevent the trolley 14 from traveling off the track 16. In phantom lines in FIG. 10, the trolley 14 is shown in this stop position. The springs 80 will apply a force to return the stop plate 76 and to its original position spaced away from the stop bracket 72.

The stop bracket 72 is attached to the solid surface, such as the fence post shown in FIGS. 9 and 10, with a bolt or screw 70 inserted into a hole through one end or leg of the stop bracket 72.

Various sizes of trolleys may be provided to tether and restrain various sizes of animals. For instance, a small dog would be restrained by a smaller apparatus than a large dog or a horse.

I claim:

1. An apparatus for tethering and restraining an animal, comprising:

a track attached to a solid surface, wherein the track has a flange with an upper surface and side surfaces and the track has a pair of side webs;

a moveable trolley mounted on the track, adjacent to the flange of the track, wherein the moveable trolley has a housing defining a pair of slots, and a pair of wheels, each wheel mounted on an axle within the housing with one end of each axle held within one of the slots, means for biasing the wheels against the side webs of the track and swiveling the trolley housing; and tether means for attaching the animal to the moveable trolley, wherein the trolley housing is swivelable from side to side of the track, but not releasable from the track, when the tether means is subjected to a force at an angle to the direction of travel of the trolley along the track;

so that when the animal tugs at the tether means in the direction of travel of the track or at an acute angle thereto, the trolley wheels travel at all times substantially in proximate contact with the side webs of the track, the housing swivels, but does not release from the track, and the tether means, trolley and track prevent the animal from roaming to a distance from the track beyond the length of the tether means.

2. The apparatus for tethering and restraining an animal of claim 1 further comprising a stone guard, on or attached to the moveable trolley housing, for clearing debris from the surfaces of the flange and the side webs.

3. The apparatus for tethering and restraining an animal of claim 1, wherein the track is attached to a substantially horizontal solid surface.

4. The apparatus for tethering and restraining an animal of claim 3, wherein the track is attached to the ground.

5. The apparatus for tethering and restraining an animal of claim 1, wherein the track is attached to a substantially vertical solid surface.

6. The apparatus for tethering and restraining an animal of claim 1, further comprising a track stop means.

7. The apparatus for tethering and restraining an animal of claim 1, wherein the track forms a circuital course.

8. A method for tethering and restraining an animal, comprising:

attaching a track with a flange and a pair of side webs to a solid surface;

mounting a moveable trolley on the track adjacent to the flange, the trolley having a housing defining a pair of slots, and a pair of wheels, each wheel mounted on an axle within the housing with one end of each axle held within one slot, means for biasing the wheels against the side webs of the track and swiveling the trolley housing, so that the trolley may travel on the track in at least one direction with the wheels in proximate contact with the side webs of the track and the housing being swivelable from side to side of the track; and tethering the animal to the moveable trolley with tether means so that when the animal tugs at the tether means in the direction of travel of the track or at an acute angle thereto, the trolley travels along the track with the trolley wheels remaining in proximate contact with the side webs of the track, the trolley housing being swivelable from side to side of the track, but not releasable from the track.

9. The method of claim 8, further comprising clearing debris from the track flange and side web surfaces as the trolley travels along the track with a stone guard on the trolley housing.

10. The method of claim 8, wherein the track is attached to a substantially horizontal solid surface.

11. The method of claim 10, wherein the track is attached to the ground.

12. The method of claim 8, wherein the track is attached to a substantially vertical solid surface.

13. The method of claim 8, wherein the track forms a circuital course.

* * * * *